United States Patent [19]

Adams et al.

[11] 4,437,681
[45] Mar. 20, 1984

[54] INFLATOR FOR A PROTECTIVE INFLATABLE CUSHION SYSTEM

[75] Inventors: Gary V. Adams, Brigham City; Fred E. Schneiter, Ogden, both of Utah

[73] Assignee: Thiokol Corporation, Chicago, Ill.

[21] Appl. No.: 392,210

[22] Filed: Jun. 25, 1982

Related U.S. Application Data

[63] Continuation of Ser. No. 152,921, Jun. 3, 1980, abandoned.

[51] Int. Cl.³ .............................................. B60R 21/10
[52] U.S. Cl. ................................................... 280/733
[58] Field of Search ............................... 102/530, 531; 280/736–742, 733; 422/165–167

[56] References Cited

U.S. PATENT DOCUMENTS

| | | | |
|---|---|---|---|
| 3,532,358 | 10/1970 | Selwa | 422/166 |
| 3,532,360 | 10/1970 | Leising | 280/736 |
| 3,905,615 | 9/1975 | Schulman | 280/733 |
| 3,948,541 | 4/1976 | Schulman | 280/733 |
| 3,972,545 | 8/1976 | Kirchoff | 280/741 |
| 4,178,017 | 12/1979 | Ishi | 280/742 |
| 4,348,037 | 9/1982 | Law | 280/733 |

Primary Examiner—Joseph F. Peters, Jr.
Assistant Examiner—Timothy Roesch
Attorney, Agent, or Firm—Gerald K. White

[57] ABSTRACT

An inflator or gas generator is provided for inflating a protective cushion associated with a safety harness used in a vehicle including an aircraft. The generator is of a structure which provides a maximum quantity of inflating gases for a minimum size, weight, shape and general compactness of the generating unit.

7 Claims, 5 Drawing Figures

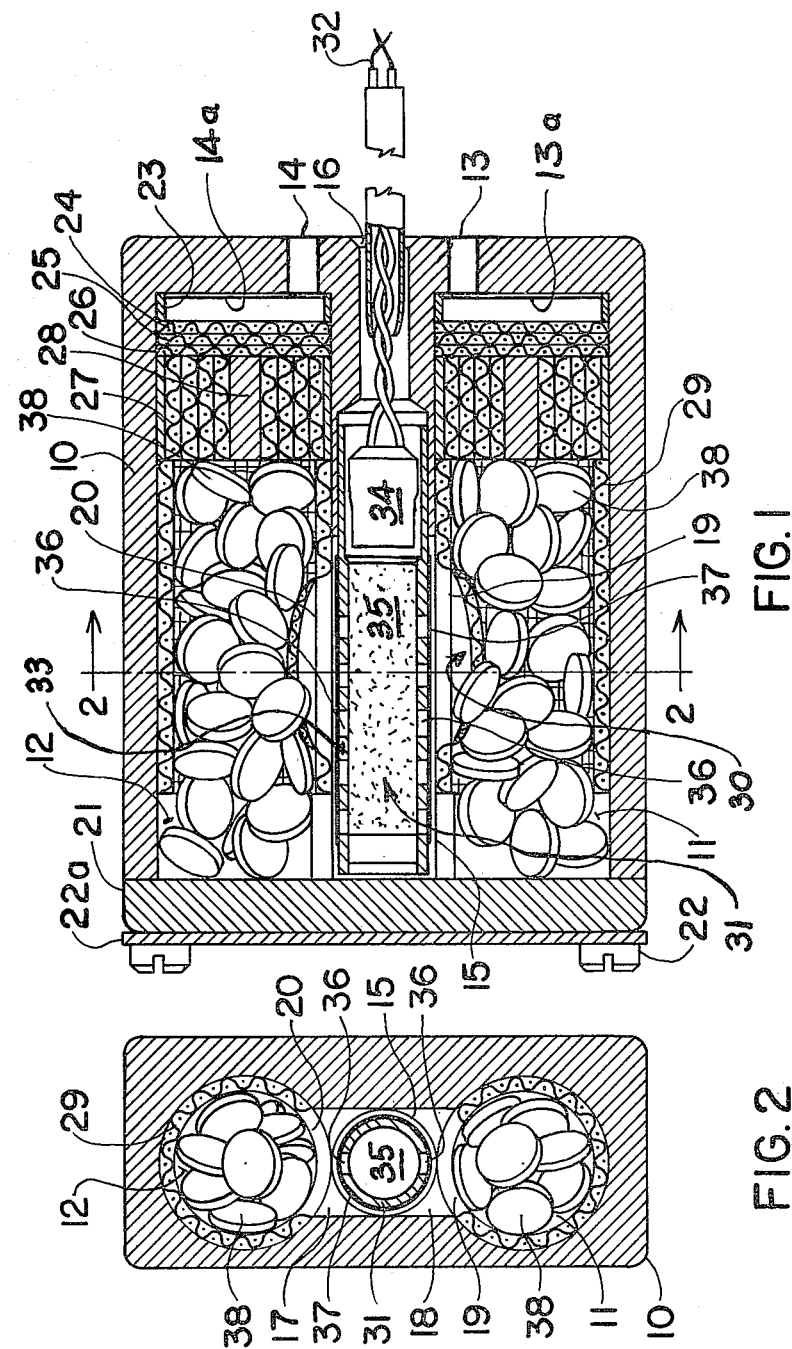

U.S. Patent  Mar. 20, 1984  Sheet 2 of 2  4,437,681
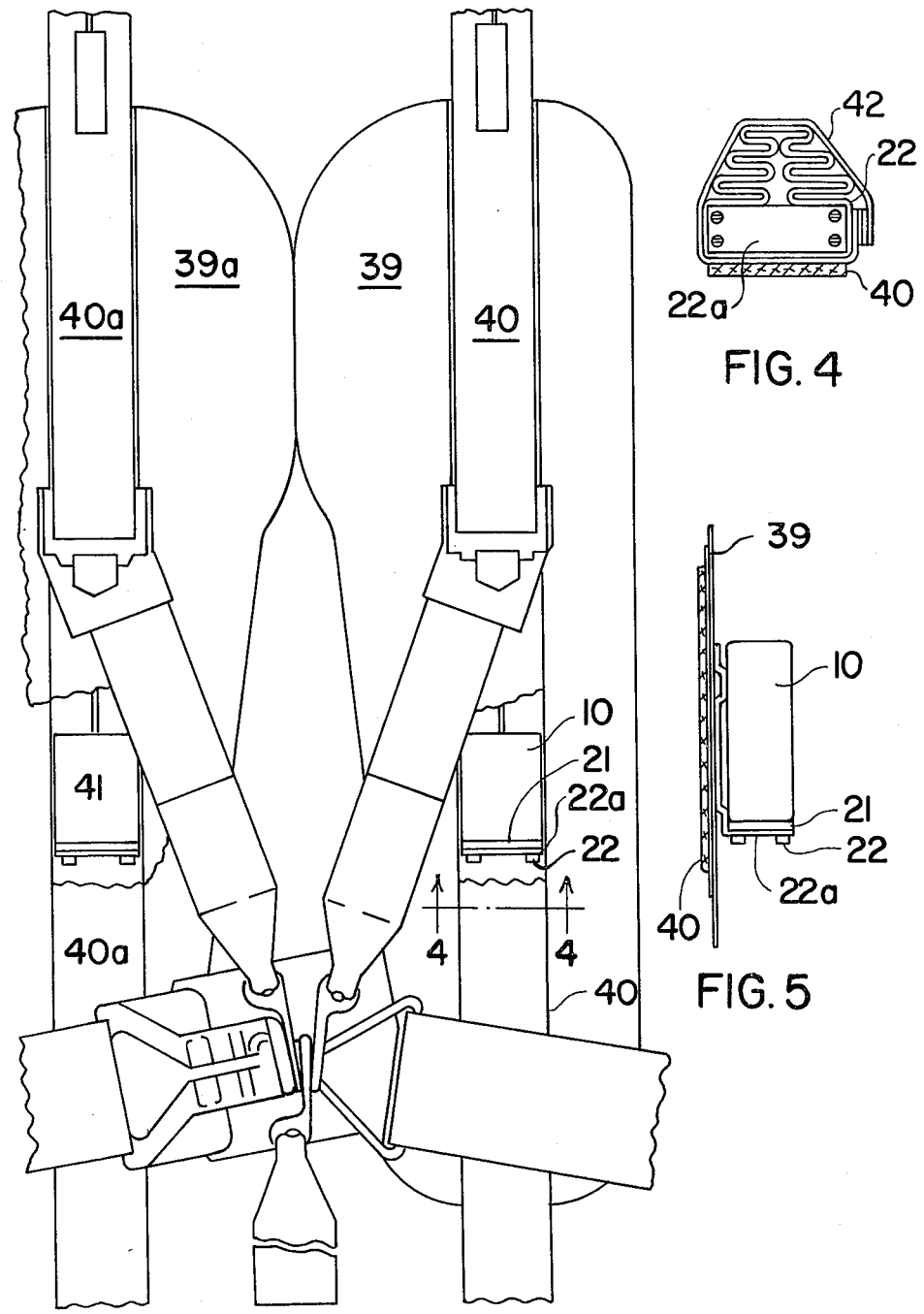

INFLATOR FOR A PROTECTIVE INFLATABLE CUSHION SYSTEM

The Government has rights in this invention pursuant to Contract No. N62269-77-C-0025 awarded by the Department of the Navy.

This application is a continuation of application Ser. No. 152,921, filed June 3, 1980 now abandoned.

BACKGROUND OF THE INVENTION

1. Field of the Invention

This invention relates to gas generators of a compact size and light weight for supplying a gas to inflate an inflatable safety cushion apparatus that is attachable to passive belt type restraints used in various vehicles including aircraft.

2. Description of the Prior Art

Various forms of restraints have been proposed in the prior art for the protection of vehicle occupants. Specifically, there have been provided inflatable seat belt-shoulder harness systems, and inflatable air bag systems. Inflatable belt and harness systems and inflatable air bag systems are designed to provide a greater degree of protection than the conventional seat belt and shoulder harness systems are capable of for the vehicle occupants.

The inflatable restraint systems of the prior art are complex and expensive, and are characterized by their longer than desirable "reaction time", that is the length of time required for inflation and effective constraining action on the user upon a crash impact. Additionally, the prior art inflatable restraint systems depend on the surrounding structure for functional support and are best suited for installation at the time of manufacture of the vehicle. Among the reasons for this is that the inflatable belt systems require, in addition to the use of a special inflatable belt, the mounting in the vehicle, of a pressurized gas supply or inflator that is connected to the inflatable belt by an elongated tube or pipe. The inflatable air bag systems involve mounting in the steering wheel hub and/or in the dashboard of the vehicle of a folded and compacted air bag that is inflatable to a relatively large volume, and a pressurized gas supply or gas generator.

With prior art inflatable belt-type restraint systems, the time required to transport the inflation gas from a remote source results in an undesirable delay in the inflation of the inflatable belt. This extends the reaction time of the system beyond a value that is optimum for protection of the user in the most comfortable manner. The relatively larger volume of the air bag, and the relatively large distance between the folded and compacted bag and the user that must be traversed by the inflated bag, upon a crash impact, to constrain the user also cause the reaction time of the inflatable air bag restraint systems to be longer than desirable. As a consequence, for both the inflatable belt and the inflatable air bag restraint systems of the prior art as proposed for use in automotive vehicles, the longer than desirable reaction time upon a crash impact tends to allow some movement of the user to occur, thus exposing the user to an undesirable shock of sudden, hard constraint.

There thus exists a need in the art for not only an improved restraint for the protection of the occupants of vehicles involved in crashes, but a need for an improved gas generator for supplying the gas to such a device in a rapid and direct manner.

There further exists a need for a compact, lightweight and effective gas generator to be used inside a safety cushion of the type described in commonly owned, co-pending patent application Ser. No. 152,922 filed on even date with the present application by Bliss W. Law, et al, now U.S. Pat. No. 4,348,037. Some gas generators which are located in their entirety within the inflatable bladder of an inflatable body and head restraint are shown in U.S. Pat. No. 3,905,615 to Schulman issued Sept. 16, 1975 and in U.S. Pat. No. 3,948,541 to Schulman issued Apr. 6, 1976. These do not however, solve the problem of compactness, lightness of weight and of a shape to provide maximum comfort and safety to the user.

Gas generators in the art have generally been cylindrical with the propellant about some central core in either a doughnut shape, concentric cylinders or discs. Such an arrangement tends to make them too bulky and too thick for use with safety cushions applied to safety harnesses.

The gas generator or inflator of the present invention inflates the safety cushion with an innocuous gas such as nitrogen and is entirely enclosed in the safety cushion. The inflator is attached to suitable sensor apparatus that detects and responds to crash impacts of the vehicle in which it is installed. In order to achieve a desirable compactness, and in particular, a flat, slim configuration suitable for attachment to the safety harness between it and the occupant, the inflator has dual side by side combustion chambers having longitudinal axes that lie in a common plane. The combustion chambers are filled with gas generant material that is ignitable by a central igniter located between them and also in side by side relationship with them thus providing a very flat, compact and safely shaped package for the gas generator which is at the same time capable of efficient and quick gas generation in sufficient quantity but in minimum size. The inflator contains appropriate filters and cooling means, and is capable of inflating the safety cushion within about 15 milliseconds. Such rapid inflation of the safety cushion apparatus contributes importantly to the attainment of a desirably short reaction time.

OBJECTS OF THE INVENTION

It is, therefore, an object of the present invention to provide a gas generator capable of inflating a safety cushion in an acceptably rapid time wherein the generator comprises a compact flat unit without protrusions which might be uncomfortable or dangerous to the user of the cushion.

It is also an object of the present invention to provide a gas generator of the foregoing type wherein gas generation chambers and an igniter are arranged in a side by side coplanar relationship.

It is also an object of the present invention to provide a gas generator of the foregoing type wherein a maximum of gas is generated by minimum size and dimension of the gas generator housing.

It is also an object of the present invention to provide a gas generator of the foregoing type wherein the generated gas released from the generating unit is cool and clean enough so as not to create a hazard to the person using the equipment and to the equipment itself.

It is also an object of the present invention to provide a gas generator of the foregoing type which is lightweight.

It is also an object of the present invention to provide a gas generator of the foregoing type wherein the generator can be disassembled easily and recharged for further use.

Other objects and advantages of the present invention will become apparent from the description and claims which follow.

THE DRAWINGS

FIG. 1 is a longitudinal cross section of the gas generator showing its interior and the location of the gas generating material and filters;

FIG. 2 is a transverse cross section of the gas generator taken on lines 2—2 of FIG. 1 looking in the direction of the arrows;

FIG. 3 is a view of a restraining harness showing the location of an inflated safety cushion and the location of the gas generator with respect to it;

FIG. 4 is a cross sectional view of the safety cushion in its uninflated, folded condition taken on lines 4—4 of FIG. 3 looking in the direction of the arrows and showing the gas generator inside the bag;

FIG. 5 is a side external view of a portion of the restraining harness showing the location of the gas generator within the safety cushion.

DETAILED DESCRIPTION OF THE INVENTION

With particular reference to FIGS. 1 and 2 of the drawings, the gas generator includes a solid body 10 which is provided with two longitudinal chambers or cavities 11, 12 having longitudinal axes that lie in a common plane and that extend substantially parallel to the sides of the body 10 having the longer dimension. The chambers 11 and 12 are closed at their right hand end in FIG. 1 except for outlet ports 13, 14 which are sealed by aluminum foil seals 13a, 14a. In between chambers 11, 12 is a third chamber or cavity 15 having an opening 16 at its right hand end in FIG. 1. Chamber 15 is open at its left hand end in FIG. 1, is of somewhat smaller diameter than the bores 11, 12 and has large elongated ports 17, 18 through its sides corresponding with in contiguous relation to similar ports 19, 20, respectively, through the side walls of chamber 11, 12 to afford communication from chamber 15 into chambers 11, 12. All three chambers are arranged in coplanar side-by-side relationship as shown in the drawings in order to afford as thin and compact a package as possible suitable for use between a person's body and a safety harness as mentioned previously in this specification and to provide a minimum size for a maximum gas output. A cover or end plate 21 is provided which covers the open end of the chamber bores 11, 12 and 15 and is held tightly in place by means of screws 22 which also provide an attachment means for a mounting bracket 22a. The mating surfaces of body 10 and cover 21 are each machined to provide a substantially flat surface and a coating of an epoxy compound is applied between them at the time of assembly to prevent any leakage of gases.

Before cover 21 is put in place, however, chamber 11, 12 are both filled with filtering material and gas-generating propellant in the following manner. A spacer ring 23 is placed in each chamber 11, 12 followed by disclike stainless steel filter screens 24, 25, screen 25 being of a fine mesh and screen 24 of a coarser mesh with screen 24 to the right of screen 25 in FIG. 1 in a position downstream of the flow of gases from chambers 11 and 12. To the left of screen 25 (upstream) is a porous layer or layered screen 26 of pH adjusting material such as ferrous sulfate. Just upstream of layer 26 (to its left in FIG. 1) is another stainless steel filter screen 27 which is spirally wrapped on a pin 28 and inserted as a unit during assembly of the gas generator. Still another stainless steel filter screen 29 is provided about the inner wall of each chamber 11, 12 with a suitable opening 30 provided in each as shown to provide easy communication with the igniter cavity 15 through ports 19, 20 and 17, 18. Screen 29 is several layers thick but leaves most of the volume of chambers 11, 12 open to receive gas generant. This gas generant comprises pellets 38 which substantially fill the remaining space in each of chambers 11, 12 with the pellets 38 made of a typical formulation for gas generants such as about 70 percent sodium azide ($NaN_3$), 28 percent molybdenum disulfide ($MoS_2$) and 2 percent sulfur. Both chambers 11, 12 are filled with these pellets 38 after igniter 31 is put in place in cavity 15. Its connecting wires 32 pass out of the gas generator through opening 16 from where they are connected to an inflation initiator or sensor (not shown) associated with the harness and the vehicle to which it is attached and which responds to crash impacts.

The igniter 31 is of a type customarily employed in the ignition of gas generators and comprises a tubular shell 33 which contains an electrically operated squib 34 and fast burning igniter material 35. Shell 33 is perforated as shown at 36 to afford communication with chambers 11, 12 and the perforations are covered with easily destructible tape 37 on its exterior to protect the contents during handling and installation into cavity 15.

The gas generator is then ready to be closed and end plate or cover 21 is fastened in place by means of screws 22 which also pass through bracket 22a to hold it in place. Epoxy compound is applied, as mentioned previously in this specification, to the mating surfaces of body 10 and end plate 21 to act as a sealing compound. The gas generator unit is then put in place inside the safety cushion 39 with the whole assembly attached to the harness and enclosed in a protective cover 42 with the safety cushion 39 folded inside of it. The cover 42 is closed and fastened by a suitable pull-apart fastener.

OPERATION OF THE INVENTION

As mentioned previously in this specification, the gas generator is made to function on receipt of a signal from a sensor (not shown) which detects that the vehicle with which it is associated has been involved in a collision. This signal to the gas generator is in the form of an electric impulse to the igniter 31 which causes ignition of squib 34. This action in turn causes ignition of the igniter material 35 which burns very rapidly and destroys or blows off tape 37 after which its flame and high temperature gases pass out through perforations 36 into chambers 11, 12 and ignite the gas generant pellets 38. As these burn, gas is generated which, because of its high pressure, forces its way through the various filter screens, ruptures the aluminum foil seals 13a, 14a, and flows to outlet openings 13, 14 from which it enters directly into the surrounding inflatable bag or can be conducted to such an inflatable located nearby. The generated gas first encounters screen 29 where cooling of the gas takes place to some extent and some relatively large pieces of gas generating material become trapped before they enter, or interfere with the operation of, the remaining screens. Next the gas passes through spirally wrapped screen 27 where additional material is filtered out and additional cooling of the gas occurs. The gas then passes through the porous layer 26 of pH adjusting material which changes the pH value of the gas to neutralize it to an acceptable value after which the gas passes through screens 25, 24 to the outlets 13, 14. The spacer ring 23 serves to keep the filter screen 24 off the end walls of chambers 11, 12 so that outlets 13, 14 will not become blocked. This entire action takes place very rapidly so that the safety cushion 39 becomes totally inflated within about 15 milliseconds.

The entire gas generator is located within a safety cushion 39 applied to a safety harness 40 as shown in FIGS. 3, 4 and 5 in the manner shown in the commonly owned and co-pending application for patent of Bliss W. Law, et al bearing Ser. No. 152,922, filed on even date herewith and mentioned earlier in this specification. As gas is generated, it flows directly into cushion 39 as stated above, and fully inflates it within about 15 milliseconds with the overall reaction time of the whole system including operation of the sensor taking not more than about 20 to 25 milliseconds.

A gas generator is ordinarily used for each safety cushion. In connection with the safety harness 40 shown in FIG. 3, a second identical gas generator 41 is used to inflate a matching safety cushion for the second upright strap of a shoulder harness 40a (the left hand strap in FIG. 3). Others could be used in other locations between the strap and the body of the occupant where an additional cushion is needed.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore to be limited only as indicated by the scope of the following claims.

I claim:

1. A gas generator located on a support strap of a safety harness of a vehicle restraint within a safety cushion thereof for inflating said safety cushion, said gas generator comprising:

a body having the form of a thin, flat rectangular package and including plural side-by-side, elongated combustion chambers having longitudinal axes which lie in a common plane and extend substantially parallel to the sides of said rectangular package having the longer dimensions, each of said combustion chambers being filled with gas generating material and including filtering, cooling and pH-adjusting screens, said generator body further including an igniter having a longitudinal axis and being commonly located with respect to and in communicating relation with at least two of said chambers, each of said chambers having an outlet formed in said generator body, said outlet being in direct communication with the interior of said cushion for inflating said cushion; and ignition means for said igniter.

2. A gas generator as in claim 1 in which the combustion chambers are dual chambers and the igniter is centrally located between said dual chambers.

3. A gas generator as in claim 1 in which the longitudinal axis of said igniter lies in the common plane in which the longitudinal axes of said combustion chambers lie.

4. A gas generator as in claim 2 in which the longitudinal axes of said igniter and said dual chambers lie in a common plane.

5. A gas generator as in claim 1 in which said body further includes a removable cap for closing one end of said chamber and said igniter.

6. A gas generator as in claim 1 further including means for mounting said generator in said safety cushion when locating said generator within said cushion on said harness strap.

7. A gas generator as in claim 1 in which each of said combustion chambers includes an elongated port that extends substantially parallel to the longitudinal axes of said combustion chambers, in which said igniter is an electrically activated type having electrical connecting wires for the activation thereof, in which said body includes an elongated igniter chamber for said igniter that is located in between said combustion chambers with the longitudinal axis thereof substantially parallel to the longitudinal axes of said combustion chambers, said igniter chamber including an elongated port on each of the opposite sides thereof with one of said igniter chamber ports being disposed in contiguous relation with one of said combustion chamber ports and the other of said igniter chamber ports disposed in contiguous relation with the other one of said combustion chamber ports to afford communication between said igniter chamber and said combustion chambers, including a plate to cover one end of the combustion and igniter chambers, the outlets for each of said combustion chambers being at the other ends thereof, and further including an opening at the other end of said igniter chamber through which said electrical connecting wires may pass out of said body for connection to said electrical means.

* * * * *